United States Patent
Rothman et al.

(10) Patent No.: US 7,831,858 B2
(45) Date of Patent: Nov. 9, 2010

(54) EXTENDED FAULT RESILIENCE FOR A PLATFORM

(75) Inventors: Michael A. Rothman, Puyallup, WA (US); Vincent J. Zimmer, Federal Way, WA (US); Robert C. Swanson, Olympia, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 11/897,739

(22) Filed: Aug. 31, 2007

(65) Prior Publication Data
US 2009/0063836 A1 Mar. 5, 2009

(51) Int. Cl.
*G06F 11/00* (2006.01)
(52) U.S. Cl. ............................ 714/5; 714/8; 711/113
(58) Field of Classification Search ............... 714/5
See application file for complete search history.

(56) References Cited

U.S. PATENT DOCUMENTS

| | | | | |
|---|---|---|---|---|
| 5,592,616 A * | 1/1997 | Finch et al. | ............ | 714/42 |
| 5,862,314 A * | 1/1999 | Jeddeloh | ............ | 714/8 |
| 6,189,111 B1 * | 2/2001 | Alexander et al. | ............ | 714/8 |
| 6,467,048 B1 * | 10/2002 | Olarig et al. | ............ | 714/7 |
| 6,505,305 B1 * | 1/2003 | Olarig | ............ | 714/5 |
| 7,043,666 B2 * | 5/2006 | Wynn et al. | ............ | 714/8 |
| 7,055,054 B2 * | 5/2006 | Olarig | ............ | 714/5 |
| 7,107,398 B2 * | 9/2006 | Depew et al. | ............ | 711/114 |
| 7,321,990 B2 * | 1/2008 | Zimmer et al. | ............ | 714/42 |
| 7,380,136 B2 * | 5/2008 | Zimmer et al. | ............ | 713/193 |
| 7,430,683 B2 * | 9/2008 | Zimmer et al. | ............ | 714/2 |
| 7,433,985 B2 * | 10/2008 | Ayyar et al. | ............ | 710/260 |
| 2003/0125908 A1 * | 7/2003 | Wynn et al. | ............ | 702/186 |
| 2003/0154392 A1 * | 8/2003 | Lewis | ............ | 713/200 |
| 2004/0073829 A1 * | 4/2004 | Olarig | ............ | 714/6 |
| 2004/0103299 A1 * | 5/2004 | Zimmer et al. | ............ | 713/200 |
| 2004/0268135 A1 * | 12/2004 | Zimmer et al. | ............ | 713/189 |
| 2005/0097239 A1 * | 5/2005 | Kadatch et al. | ............ | 710/22 |
| 2005/0138465 A1 * | 6/2005 | Depew et al. | ............ | 714/5 |
| 2005/0188278 A1 * | 8/2005 | Zimmer et al. | ............ | 714/42 |
| 2006/0085580 A1 * | 4/2006 | Gupta et al. | ............ | 710/260 |
| 2007/0150632 A1 * | 6/2007 | Ayyar et al. | ............ | 710/260 |
| 2009/0070630 A1 * | 3/2009 | Khatri et al. | ............ | 714/37 |
| 2009/0217093 A1 * | 8/2009 | Co | ............ | 714/30 |

* cited by examiner

*Primary Examiner*—Scott T Baderman
*Assistant Examiner*—Kamini Patel
(74) *Attorney, Agent, or Firm*—Trop, Pruner & Hu, P.C.

(57) ABSTRACT

In one embodiment, the present invention includes a method for allocating a fail-over memory region, determining if multiple processors have reached a rendezvous state, and verifying a memory failure in a system software memory region associated with a non-rendezvousing processor and sending a message to the non-rendezvousing processor to update a range register to the fail-over memory region. Other embodiments are described and claimed.

14 Claims, 3 Drawing Sheets

EXTENDED FAULT RESILIENCE FOR A PLATFORM

BACKGROUND

In a typical computer architecture, the initialization and configuration of the computer system by the Basic Input/Output System (BIOS) is commonly referred to as the pre-boot phase. The pre-boot phase is generally defined as the firmware that runs between the processor reset and the first instruction of the Operating System (OS) loader. At the start of a pre-boot, it is up to the code in the firmware to initialize the system to the point that an operating system loaded off of media, such as a hard disk, can take over. The start of the OS load begins the period commonly referred to as OS runtime. During OS runtime, the firmware acts as an interface between software and hardware components of a computer system.

When a computer system starts up, system software is loaded into memory. Usually, system software is loaded once when the computer is booted and is not removed from memory until the system is shut down. System software generally cannot be moved to a different memory location without resetting the entire computer system. System software thus generally does not have the ability to self-relocate without restarting the computer system. The system software may be able to mark a region of memory as "bad" and keep the information in persistent storage so that the next time the system starts, these faulty memory areas will be avoided when loading the system software. However, for systems that rarely reboot, such as a server, errors may grow within a region of memory until finally a complete failure occurs.

DETAILED DESCRIPTION

Embodiments may enable a platform to recover from what would otherwise be a critical failure/hang that is largely unrecoverable. Embodiments may be applied to all forms of system software to allow for the relocatable portions of legacy BIOS, Extensible Firmware Interface (EFI)-based image, or other system software to be migrated from error-vulnerable memory regions into safer locations. Embodiments may further leverage processor features to adjust the memory designated to system management random access memory (SMRAM) (i.e., memory allocated for use in a system management mode (SMM)) on a per processor basis. SMM is a special mode for handling system-wide functions and is intended for use only by system firmware, and not by an OS or an application. When SMM is invoked through a System Management Interrupt (SMI), the processor saves the current state of the processor and switches to a separate operating environment contained in SMRAM. While in SMM, the processor executes SMI handler code to perform operations. When the SMI handler has completed its operations, it executes a resume instruction. This instruction causes the processor to reload the saved state of the processor, switch back to protected or real mode, and resume executing the interrupted application or OS tasks. The processor thus uses SMRAM to save the state of the processor and to store SMM related code and data. SMRAM may also store system management information and Original Equipment Manufacturer (OEM) specific information.

By creating routines in the platform to leverage processor (i.e., central processing unit (CPU)) features, solutions to detect errors (e.g., where not all processors have entered a rendezvous state and a root cause is a CPU's SMRAM corruption due to physical memory issues) and dynamically relocate system software or other critical code may be realized.

Generally, system software includes instructions and data loaded during the pre-boot phase that persist into operating system runtime. The system software is not under the control of the operating system. In one embodiment, the system software is loaded from a firmware device during pre-boot. The operating system may not even be aware of system software that is loaded into memory. In one embodiment, during pre-boot, the firmware allocates a system software memory region for its own use and tags this portion of memory as reserved and thus not useable by the operating system. In one embodiment, one such system software component includes a Portable Executable and Common Object File Format (PE/COFF) executable image. In one embodiment, such images may execute within large regions of SMRAM top of memory segment (TSEG) (e.g., 1 MB today or 8 MB or another size).

Figure 1:
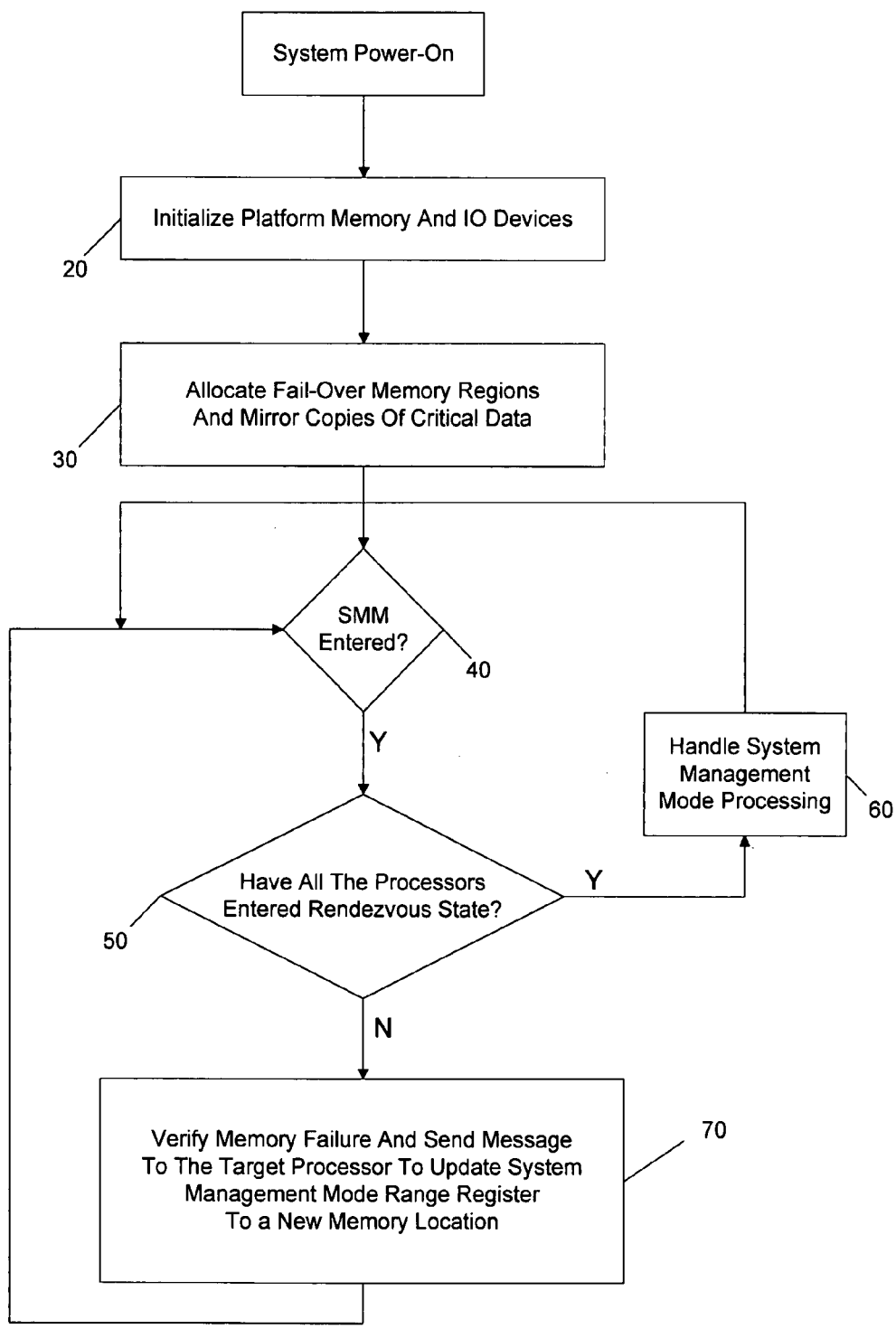
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may be used to enable and control dynamic relocation of system software based on a predetermined condition such as one or more single bit errors (SBEs) within a SMRAM or other such storage. As shown in FIG. 1, method 10 may begin by initializing platform memory and input/output (IO) devices (block 20). In various embodiments, such initialization may include memory tests, enabling of SMRAM and loading of a SMM core into the SMRAM. For example, boot instructions stored in the computer system firmware are loaded into memory and executed. In one embodiment, the system boot instructions will begin initializing the platform by conducting a Power-On Self-Test (POST) routine. During the pre-boot phase, hardware devices such as a processor, the chipset, and memory of the computer system are initialized. Also, during initialization some system software may be loaded into memory.

Referring still to FIG. 1, at block 30, one or more fail-over memory regions may be allocated. Such regions may act as reserved memory spaces for reliability-availability-serviceability (RAS) information. Furthermore, at block 30 certain critical data may be mirrored from a current location to such fail-over memory regions. While the scope of the present invention is not limited in this regard, in some embodiments critical data such as data and code of certain system software components may be copied over to these reserve locations.

As further shown in FIG. 1, control may pass to diamond 40 where it may be determined whether a SMM has been entered. If so, control passes to diamond 50, where it may be determined whether all processors (i.e., CPUs, which may be individual cores of a single processor socket or one or more cores of multiple sockets of a system) have reached a rendezvous state (diamond 50). For example, such a rendezvous state may be reached when each processor has executed a certain amount of system software (e.g., SMM code) and has reached a synchronization point. If all such processors have reached this state, control passes to block 60 where various desired SMM processing may be handled. If instead it is determined that one or more processors has not reached the rendezvous state, control passes to block 70.

At block 70, a memory failure may be verified. For example, ECC logic may determine whether one or more SBEs are present in a SMRAM associated with the non-rendezvousing processor. If so, a message such as an inter-processor interrupt (IPI) message may be sent to the non-rendezvousing CPU (referred to as the target CPU) to update its SMM Range Register (SMRR) to a new memory location.

Thus, a call into the failing CPU's SMRR to have the CPU stop referencing the failing memory and use an alternate location so that it can properly operate may occur. In various embodiments, this memory location may correspond to one or more of the fail-over memory regions allocated in block 30. Furthermore, while not shown in block 70, various alerts may be sent to an administrator or user to indicate that system services are having such failure issues. While shown with this particular implementation in the embodiment of FIG. 1, the scope of the present invention is not limited in this regard.

In one implementation, SMM code is alerted by a chipset (e.g., a memory controller) regarding the generation of SBE, as generated by Error Correction Code logic in the memory subsystem. In addition, migration to a safe region can be enabled by SMM drivers when they ascertain SBE locations, and if they fall within the active code regions, the drivers can: (1) allocate additional SMRAM; (2) perform a self-relocation; and (3) re-invoke their image with their former private and state data as input arguments. The former location of the driver can be marked as "allocated" and the respective SBE's logged to flash in a System Error Log (SEL) or a baseboard management controller for later analysis. A system software manager may be used to track the location of system software components in memory. This self-migration of the code is thus agile, and the migration based on memory faults leads to fault-resilient.

Figure 2:
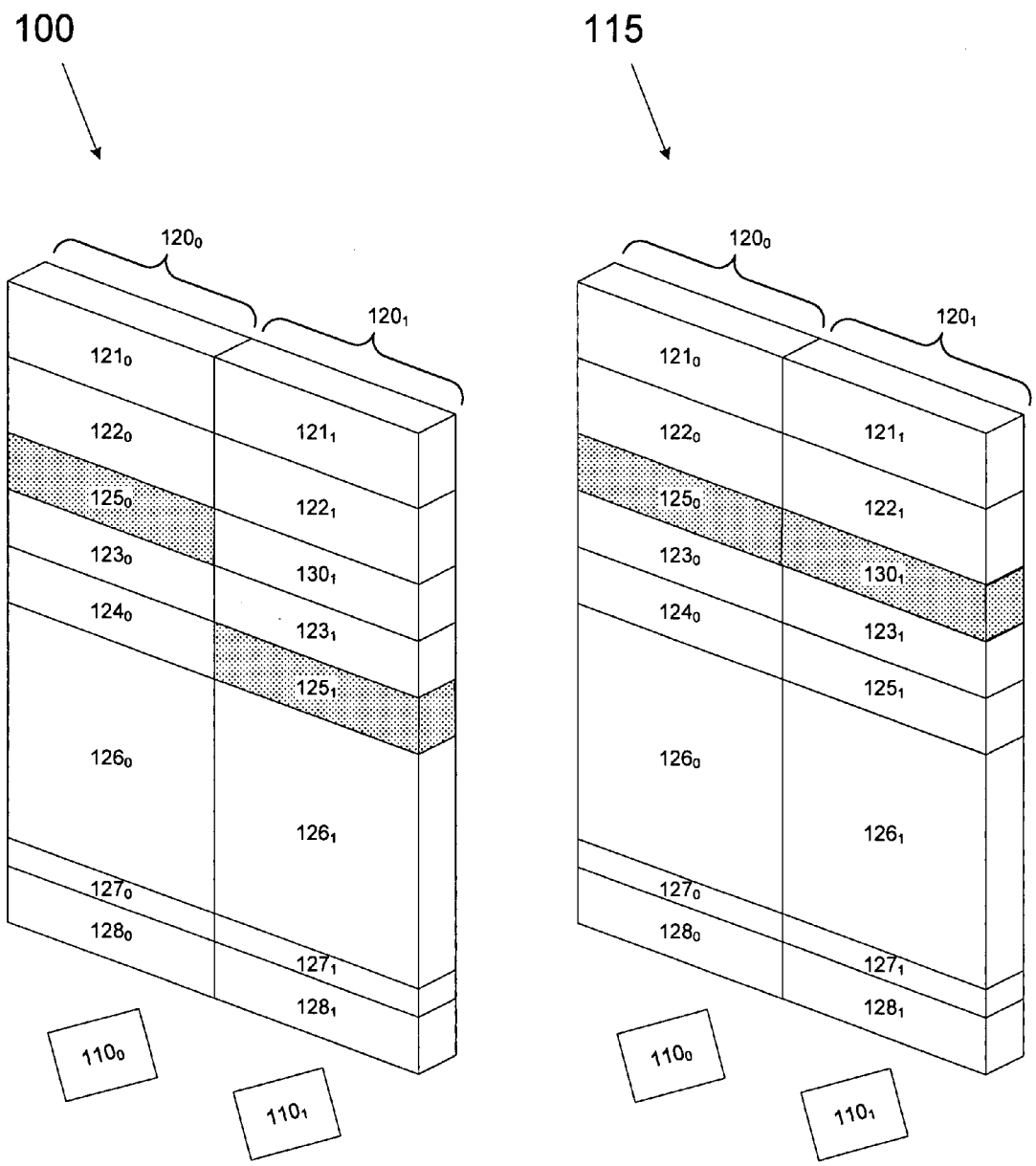
FIG. 2 is a block diagram of a portion of a system in accordance with an embodiment of the present invention.

Referring now to FIG. 2, shown is a block diagram of a portion of a system in accordance with an embodiment of the present invention. As shown in FIG. 2, system 100 includes a pair of processors, namely CPUs $110_0$ and $110_1$. Each processor has a portion of system memory associated therewith, i.e., memory $120_0$ and $120_1$. As shown in FIG. 2, at a first time instance 105, different critical SMM regions may be assigned to the different processors. Thus as shown in FIG. 2, at the first time 105 SMRAM TSEG $125_0$ is at an address x, while SMRAM-TSEG $125_1$ is at an address y. As further shown in FIG. 1, additional portions of memory may correspond to BIOS ROM $121_0$ and $121_1$. Additional portions of memory may correspond to IO controller space $122_0$ and $122_1$, available memory $123_0$ and $123_1$, reserved memory $124_0$, available memory $126_0$ and $126_1$, additional reserved memory $127_0$ and $127_1$ and additional available memory $128_0$ and $128_1$.

Assume, e.g., in the context of a rendezvous operation, that processor $110_1$ does not successfully rendezvous. Accordingly, a message may be sent to processor $110_1$, e.g., via an SMM IPI message, to update its SMRR for a new TSEG, as shown at a second time 115. Embodiments thus enable system software to proactively adjust the SMRAM settings without a reset and recover what otherwise would have been a catastrophic failure into something that maintains system operation. Accordingly, access can be migrated away from bad regions to dynamically repurpose critical regions to alternate locations. At this second time, SMRAM-TSEG $130_1$ is now at address x, while the address of memory $125_1$ corresponds to a bad memory area.

Migrating away from faulty memory regions increases system reliability and reduces performance overhead. Migrating away from memory areas that generate SBEs may avoid a Multi-Bit Error (MBE.) Generally, an SBE includes a single bit of data being incorrect when reading an entire byte (or word). An MBE includes more than one bit in a complete byte being incorrect. Usually, an MBE is not correctable, so the data or code that was stored in that region of memory is lost. Also, numerous SBEs create performance overhead because of the need for constant scrubbing and logging of errors.

It will be appreciated that embodiments of the present invention allow for system software to perform self-healing actions independent of the operating system. Instructions and data in memory under control of firmware may be allocated and migrated without the firmware consulting the operating system. Moreover, this migration of system software is done dynamically to prevent system down-time that would be caused if the system had to be re-booted after a system software migration. The system software itself detects errors and performs the relocation of a system software component.

The handling of memory relation in accordance with embodiments of the present invention may be initiated by a SMI within a so-called Intel Architecture™ (IA32) processor and a platform management interrupt (PMI) with an Intel Itaniumm™ family processor, which involve similar processes. Embodiments may thus provide additional platform robustness. For example, server deployments rely heavily on SMI and PMI-based capabilities. With the rich error capture information in the enterprise chipsets, firmware can adapt to the varying integrity of memory. Embodiments may thus represent a means by which software can make itself healthier. Most traditional models of computation assume that memory is a simple read/write store with perfect integrity. Embodiments thus allow for a real-world programming model where agile code in the machine can move from unhealthy memory to healthier memory.

Figure 3:
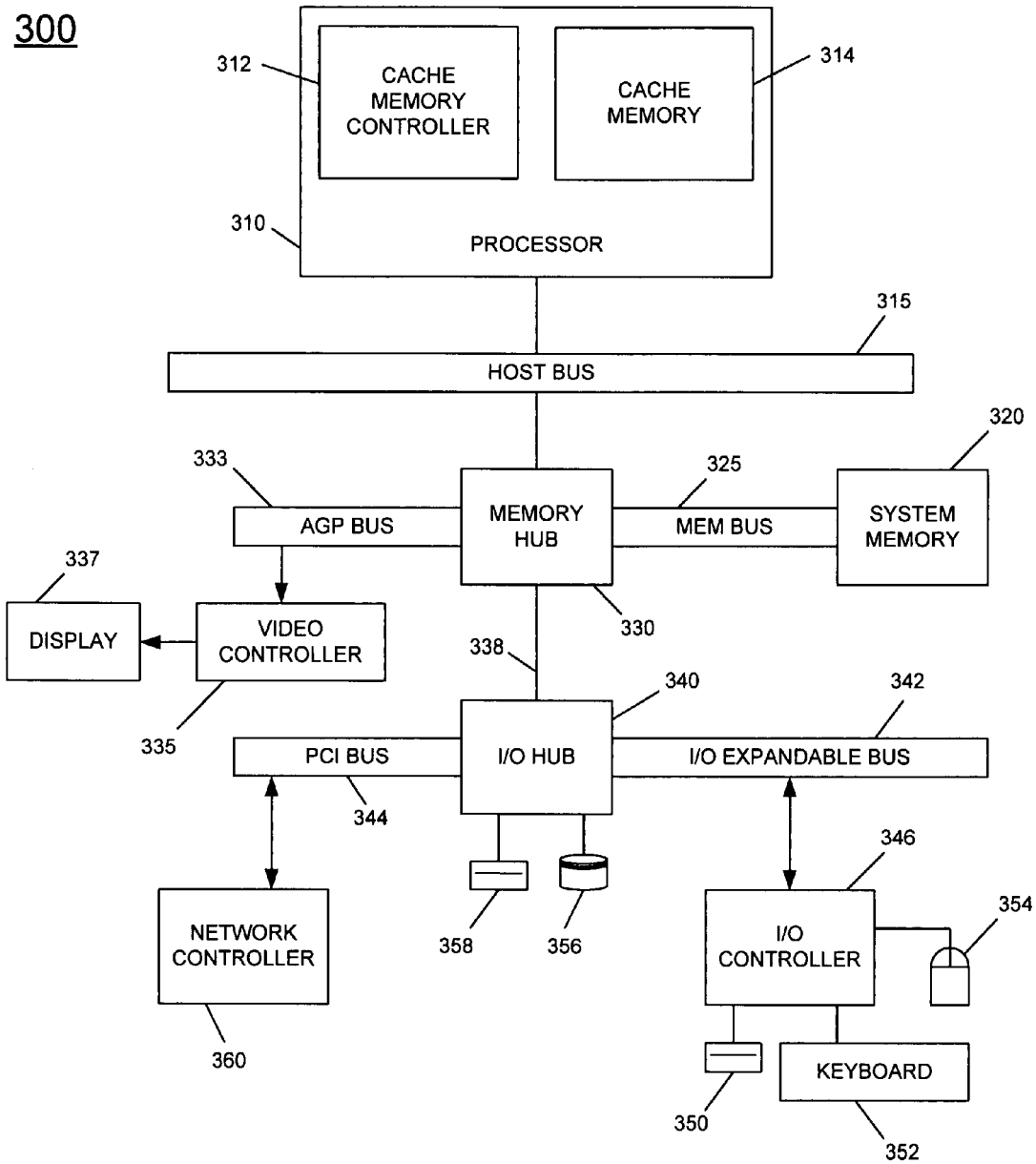
FIG. 3 is a block diagram of a computer system in accordance with one embodiment of the present invention.

Embodiments may be used in various systems. FIG. 3 is a block diagram of a computer system 300 in which embodiments of the invention may be used. As used herein, the term "computer system" may refer to any type of processor-based system, such as a notebook computer, a server computer, a laptop computer, or the like.

Now referring to FIG. 3, in one embodiment, computer system 300 includes a processor 310, which may include a general-purpose or special-purpose processor such as a microprocessor, microcontroller, a programmable gate array (PGA), and the like. Processor 310 may include a cache memory controller 312 and a cache memory 314. While shown as a signal core, understand that embodiments may include multiple cores and may further be a multiprocessor system including multiple processors 310. Processor 310 may be coupled over a host bus 315 to a memory hub 330 in one embodiment, which may be coupled to a system memory 320 (e.g., a dynamic RAM) via a memory bus 325. Memory hub 330 may also be coupled over an Advanced Graphics Port (AGP) bus 333 to a video controller 335, which may be coupled to a display 337.

Memory hub 330 may also be coupled (via a hub link 338) to an input/output (I/O) hub 340 that is coupled to an input/output (I/O) expansion bus 342 and a Peripheral Component Interconnect (PCI) bus 344, as defined by the PCI Local Bus Specification, Production Version, Revision 2.1 dated June 1995. In one embodiment, system memory 320 may include various portions to be designated as SMRAM and as fail-over regions. Still further, relocation code to perform embodiments of the present invention may be present in system memory 320 or other storage locations of system 300.

I/O expansion bus 342 may be coupled to an I/O controller 346 that controls access to one or more I/O devices. As shown in FIG. 3, these devices may include in one embodiment storage devices, such as a floppy disk drive 350 and input devices, such as a keyboard 352 and a mouse 354. I/O hub 340 may also be coupled to, for example, a hard disk drive 358 and a compact disc (CD) drive 356, as shown in FIG. 3. It is to be understood that other storage media may also be included in the system.

PCI bus 344 may also be coupled to various components including, for example, a network controller 360 that is coupled to a network port (not shown). Additional devices may be coupled to the I/O expansion bus 342 and the PCI bus 344. Although the description makes reference to specific components of system 300, it is contemplated that numerous modifications and variations of the described and illustrated embodiments may be possible.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    allocating at least one fail-over memory region of a system and minoring predetermined information for system software from a system software memory region to the at least one fail-over memory region;
    determining if a plurality of processors of the system have entered a system management mode (SMM) and reached a rendezvous state and if so, proceeding to perform SMM processing;
    otherwise verifying a memory failure in a system software memory region associated with the non-rendezvousing processor and sending a message to the non-rendezvousing processor to update a SMM range register (SMRR) from a first location to a second location, the second location corresponding to the at least one fail-over memory region; and
    detecting a single bit error (SBE) with a SMM driver and performing a self-relocation of the SMM driver from a location including the SBE to a safe location, and re-invoking the SMM driver using previous private and state data as input arguments.

2. The method of claim 1, wherein the message comprises an inter-processor interrupt (IPI) message.

3. The method of claim 2, further comprising performing the SMM processing in the non-rendezvousing processor after sending the message, without resetting the system.

4. The method of claim 3, wherein updating the SMRR adjusts memory designated for a system management random access memory (SMRAM) on a per processor basis, wherein the plurality of processors are of a multi-core processor.

5. The method of claim 1, further comprising marking the location including the SBE as being allocated.

6. The method of claim 1, further comprising initializing a first processor of the plurality of processors with a first system management random access memory (SMRAM) at a first address location and a second processor of the plurality of processors with a second SMRAM at a second address location.

7. The method of claim 6, further comprising remapping the second SMRAM to a third address location if a SBE is detected within a region including the second SMRAM, without resetting the system.

8. An article comprising a non-transitory machine-accessible medium including instructions that when executed cause a system to:
    allocate at least one fail-over memory region of a volatile memory to be a reserved memory space for reliability-availability-serviceability (RAS) information and minor predetermined information for system software from a system software memory region of the volatile memory to copy the predetermined information to the at least one fail-over memory region, wherein the predetermined information remains in the system software memory region;
    determine if a plurality of processors of the system have entered a system management mode (SMM) and reached a rendezvous state and if so, proceed to SMM processing;
    otherwise verify a memory failure in a system software memory region associated with the non-rendezvousing processor and send a message to the non-rendezvousing processor to update a SMM range register (SMRR) from a first location to a second location, the second location corresponding to the at least one fail-over memory region.

9. The article of claim 8, further comprising instructions that when executed cause the system to send an inter-processor interrupt (IPI) message.

10. The article of claim 9, further comprising instructions that when executed cause the system to detect a single bit error (SBE) with a SMM driver and perform a self-relocation of the SMM driver from a location including the SBE to a safe location, re-invoke the SMM driver using previous private and state data as input arguments, and mark the location including the SBE as being allocated.

11. The article of claim 8, further comprising instructions that when executed cause the system to initialize a first processor of the plurality of processors with a first system management random access memory (SMRAM) at a first address location and a second processor of the plurality of processors with a second SMRAM at a second address location.

12. A system comprising:
    a first processor;
    a second processor; and
    a dynamic random access memory (DRAM) coupled to the first and second processors, the DRAM including a first address space associated with the first processor and a second address space associated with the second processor, the first address space including a first region to store a first system software associated with the first processor and the second address space including a second region to store a second system software associated with the second processor, wherein the first system software is to be relocated without a system reset to a safe region of the first address space if the first processor does not reach a synchronization point and the first processor is to update a range register from the first region to the safe region.

13. The system of claim 12, further comprising instructions to initiate the relocation if a single bit error (SBE) is detected in the first region.

14. The system of claim 12, further comprising instructions to detect a single bit error (SBE) with a system management mode (SMM) driver and perform a self-relocation of the SMM driver from the first region to the safe region, re-invoke the SMM driver using previous private and state data as input arguments, and mark the region as being allocated.

* * * * *

UNITED STATES PATENT AND TRADEMARK OFFICE
CERTIFICATE OF CORRECTION

| | | |
|---|---|---|
| PATENT NO. | : 7,831,858 B2 | Page 1 of 1 |
| APPLICATION NO. | : 11/897739 | |
| DATED | : November 9, 2010 | |
| INVENTOR(S) | : Michael A. Rothman et al. | |

It is certified that error appears in the above-identified patent and that said Letters Patent is hereby corrected as shown below:

Column 6:
Line 3, "minor" should be --mirror--.

Signed and Sealed this
Nineteenth Day of April, 2011

David J. Kappos
*Director of the United States Patent and Trademark Office*